United States Patent [19]

Grebert

[11] 4,155,557
[45] May 22, 1979

[54] FLUID SEAL

[75] Inventor: Michel A. Grebert, Montlucon, France

[73] Assignee: Dunlop Limited, Great Britain

[21] Appl. No.: 859,609

[22] Filed: Dec. 12, 1977

[30] Foreign Application Priority Data

Dec. 16, 1976 [FR] France .................. 76 37891

[51] Int. Cl.² .............. F16J 15/32; F16J 15/48
[52] U.S. Cl. ......................... 277/27; 277/75;
    277/63; 277/152; 277/165; 277/206 R; 92/182;
    92/244
[58] Field of Search ............ 277/3, 27, 58, 59, 61,
    277/63, 74–76, 152, 153, 165, 206 R; 92/168,
    182, 184, 185, 244

[56] References Cited

U.S. PATENT DOCUMENTS

| 2,211,455 | 8/1940 | Caldwell | 92/244 X |
| 2,684,262 | 7/1954 | Neesen | 277/75 X |
| 2,926,035 | 2/1960 | Peickii et al. | 277/27 |
| 3,127,185 | 3/1964 | Evans | 277/153 X |
| 3,942,806 | 3/1976 | Edlund | 277/165 |

FOREIGN PATENT DOCUMENTS

| 2210209 | 11/1973 | Fed. Rep. of Germany | 277/75 |
| 1319925 | 1/1963 | France | 92/182 |
| 356648 | 10/1961 | Switzerland | 227/206 R |
| 554331 | 6/1943 | United Kingdom | 277/153 |
| 692717 | 6/1953 | United Kingdom | 277/153 |

Primary Examiner—Robert S. Ward, Jr.
Attorney, Agent, or Firm—Stevens, Davis, Miller & Mosher

[57] ABSTRACT

An annular seal having first and second annular end faces extending substantially perpendicular to the axis of symmetry of the seal, said annular end faces being connected to each other by two axially extending surfaces each having the same axis of symmetry as the seal, one of said axially extending surfaces defining at least in part the surface of a lobe having a summit region, and at least a first of said annular end faces being shaped to define an annular recess.

14 Claims, 4 Drawing Figures

FLUID SEAL

This invention relates to an annular fluid seal and in particular, though not exclusively, to an annular fluid seal suitable for sealing between a cylinder and piston such as may be employed in a large diameter annular jack.

The sealing of large diameter annular jacks such as those used in machines for the production of pneumatic tires has been achieved hitherto by using multi-lip annular seals. However, these have certain drawbacks. For example, to ensure adequate sealing these multi-lip annular seals must be very heavily compressed between the cylinder and piston, and there is difficulty in introducing the piston into the cylinder against the considerable force to deform the annular seal. In this operation the annular seal may be damaged and sometimes there occurs ovalization or superficial damage to the cylinder or piston. Furthermore, during this operation one of the lips of the seal can scrape off an oil film previously applied to the surface of the cylinder or piston, and the more or less complete elimination of this film of oil results in insufficient lubrication during subsequent operation of the jack, giving rise to the risk of localized carbonization of the seal. Another disadvantage is that the very high pressure with which the lips of these multi-lip seals are applied to the surface of the piston or cylinder results in a very high level of friction causing premature wear and considerable reduction in the efficiency of the jack. The high friction also inhibits the return of double-action jacks of a kind controlled by substituting a vacuum for the fluid pressure since the effect of the vacuum is generally insufficient to overcome the friction of the heavily compressed annular seals.

It is also to be noted that the high friction accompanying each maneuver of a jack equipped with conventional multi-lip seals imposes a lower limit on the speed of displacement of the piston of the order of 0.15 m/s below which movement is irregular due to a chattering phenomenon, and an upper limit of about 1 m/s, above which there are risks of localized carbonization of the seal.

In accordance with the present invention, there is provided an annular seal of elastomeric material comprising first and second annular end faces extending substantially perpendicular to the axis of symmetry of the seal, said annular end faces being connected to each other by two axially extending surfaces each having the same axis of symmetry as the seal, one of said axially extending surfaces defining at least in part the surface of a lobe having a summit region, and at least a first of said annular end faces being shaped to define an annular recess.

Preferably a single annular recess is provided in one annular face, and preferably channels are arranged to connect the said annular recess to that flank of the lobe lying on the same side of the seal as the said first annular end face.

Although the seal in accordance with the present invention can be used to resolve various sealing problems, its application is particularly advantageous for sealing a piston and cylinder, in particular of large diameter, notably in a jack, for example an annular jack. In this case, at least one annular seal in accordance with the present invention is fitted in an annular groove in the cylinder or piston, the annular seal and groove being dimensioned so that the top surface of the seal lobe projects from the annular groove and is urged against the piston with a relatively low force.

One embodiment of the invention will now be described, by way of example, with reference to the accompanying drawings in which.

Figure 1:
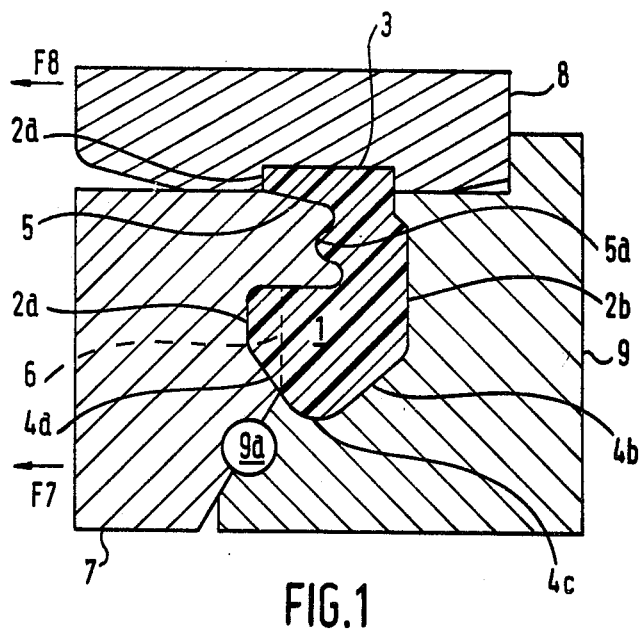
FIG. 1 shows in radial cross-section an annular seal in accordance with the present invention, and the mould used for its manufacture.
Figure 2:
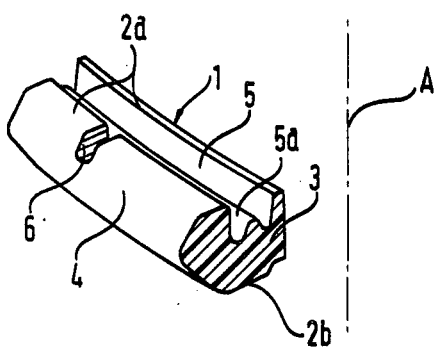
FIG. 2 shows in perspective a short sector of the annular seal shown in FIG. 1.

The annular seal in accordance with the present invention, which is illustrated in part in FIGS. 1 and 2, where it is designated '1', is made of an elastic material, such as a rubber-based mixture, a plastic material, a silicone, or appropriate mixtures of these substances.

In this embodiment, the annular seal has first and second annular end faces 2a and 2b respectively extending mainly perpendicular to the axis of symmetry of the annular seal (A in FIG. 2). The two annular faces 2a and 2b are connected together by two surfaces 3 and 4 which have the same axis of symmetry as the seal (A in FIG. 2) and extend axially in the direction of said axis of symmetry.

The connecting surface 3 is substantially cylindrical, and consequently extends substantially perpendicular to the two annular end surfaces 2a and 2b. The connecting surface 4 defines in part a lobe portion having two flanks 4a and 4b (see FIG. 1) and a rounded summit region 4c.

Finally, an annular recess 5 is formed in the annular end face 2a to provide the seal with a significant degree of radial elasticity. In the embodiment considered, the annular recess 5 is nearer the connecting surface 3 than connecting surface 4 and its depth is approximately half the axial thickness of the seal, i.e. of the distance between the two annular faces 2a and 2b. At the bottom of the recess 5 there is formed a single rib 5a. In addition channels in the form of radially extending grooves 6 are provided in the first annular face 2a to connect the annular recess 5 with the outside surface of flank 4a of the lobe, said flank 4a being situated on the same side of the seal as the annular end face 2a. Eight radial grooves 6 are provided and are uniformly positioned around the annular face 2a.

The lobe 4 is arranged in the present embodiment towards the outside of the seal, i.e. opposite to its axis of symmetry A in FIG. 2 though in an alternative embodiment it may be provided radially inwards.

The mould to produce the above described annular seal is formed by three co-axial metal segments 7, 8 and 9. In FIG. 1 F7 and F8 indicate the direction in which segments 7 and 8 respectively are removed from a moulded seal.

Figure 3:
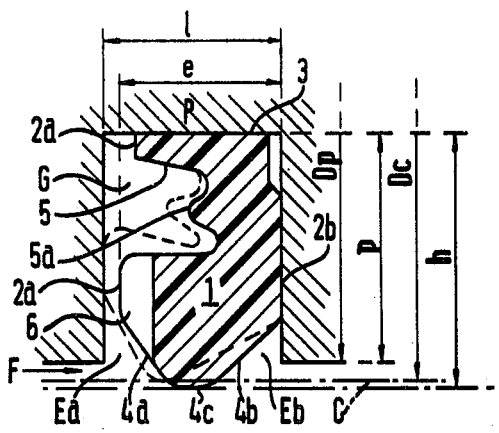
FIG. 3 shows in radial cross-section an application of the seal of FIGS. 1 and 2 to seal a cylinder and piston of a single-acting jack.

FIG. 3 shows the seal 1 of FIGS. 1 and 2 used to seal the cylinder and piston of a large diameter annular jack of the type used in tire making machines. For this application the annular seal 1 has an appropriately large diameter and is fitted into an annular groove G of the piston P. The seal 1 and the annular groove G are also dimensioned so that the summit region 4c of the lobe of seal 1 protrudes from the annular groove G. In FIG. 3, the contour in section of the annular seal 1 after its location in the annular groove G of piston P but before the piston is introduced into the cylinder is drawn with a full line. It will thus be seen that the axial thickness of seal 1 is slightly less than the axial width 1 of the annular groove G and accordingly only the second annular face 2b of the seal 1 is applied against the corresponding face of groove G. The first annular face 2a remains spaced from the other face of the said groove G. The first annular face 2a is positioned to face towards the pressure fluid side, indicated by arrow F in FIG. 3.

Where the piston P has a diameter Dp=380 mm, its annular groove G can have, for example, an axial width L=6.4 mm and a depth p=8 mm, while the annular seal can have an axial thickness e=5.5 mm and a radial width h=8.7 mm. There then results a gap of about 0.9 mm between the annular face 2a of the seal 1 and the corresponding wall of groove G, while the summit region 4c of the lobe protrudes about 0.7 mm from groove G.

In FIG. 3 the chain-dotted line C indicates the outline in the plane of the drawing, of the cylinder of diameter Dc=380.1 mm. The engagement of piston P in cylinder C results in a slight radial deformation of seal 1 so that the summit 4c of seal 1 only protrudes from groove G by about 0.05 mm. The dotted line of FIG. 3 represents the sectional contour of the seal 1 after the introduction of piston P into the cylinder C. The annular seal 1 and annular groove G are suitably dimensioned as a function of the respective diameters Dc and Dp of the cylinder and piston, and the elasticity of the seal material is selected, such that after the introduction of the piston P into cylinder C a part of the first annular face 2a below the annular recess 5 bears against the corresponding wall of groove G. Additionally, because of the radial elasticity of the seal the summit surface 4c bears against the cylinder C with a force the value of which is relatively low. This results in the rounded summit region 4c of the seal lobe having only a small scraping effect on the oil film covering cylinder C during the operation of introducing piston P and thereby assists in ensuring good lubrication during subsequent operation of the jack. It will also be understood that the high radial elasticity of seal 1, and the small radial deformation of about 0.65 mm as necessitated by the introduction of the piston into the cylinder, make this introduction very easy. There is therefore little danger of any damage to the seal or any deterioration or ovalization of the surface of the piston or cylinder.

Compared with multi-lip seals which have been used up to the present time an annular seal in accordance with the present invention used under the conditions illustrated in FIG. 3, and described above is believed to offer the following advantages:

(a) the annular piston groove—or cylinder groove— necessary for the location of the annular seal in accordance with the present invention, can have an axial width 1 less than that of the annular groove required by a seal of the previously known type.

(b) the force which is necessary to displace a piston has been measured, as a function of the pressure of the motive fluid admitted into the jack to displace its piston, on the one hand when the latter was fitted with a multi-lip seal of the previously used type, and on the other hand, in the case of the sealing system illustrated in FIG. 3. In both cases new seals, suitably lubricated, were used and the results were as follows:

TABLE 1

| Pressure of the motive fluid | Minimal force to displace the piston | |
|---|---|---|
| | Multi-lip seal | Seal as in FIG. 3 |
| 0 bar | 55 kg | 6 kg |
| 6 bars | 89 kg | 12.5 kg |
| 10 bars | 162 kg | 22.5 kg |
| 18 bars | 212 kg | 29 kg |

These results show that the minimal force to displace the piston is divided more or less by 9 when no motive fluid is used in the jack, and by about 9 when the jack is fed by motive fluid at a pressure between 6 and 18 bars. This large reduction of the minimal force facilitates the possibility of ensuring the return control of the piston by the simple substitution of the pressure fluid by a vacuum. This offers the economic advantage of avoiding recourse to an elastic return element, for example a spring, or even recourse to a double-acting jack requiring two supply lines of pressurised fluid. Comparative tests have also shown that a pneumatic jack can perform several dozen thousands, maneuvers between two successive replacements of the annular seal, on the sole condition, if it is equipped with a normal multi-lip seal, that the said jack is oil mist lubricated, the disadvantages of which has already been described. However, the same life can be obtained with an annular seal in accordance with the invention, in a pneumatic jack supplied with a dry gas, owing to the excellence and permanence of its lubrication by the oil film with which the cylinder was originally coated.

The same advantages as above can be obtained in the case of an annular seal in accordance with the present invention, located in an annular groove in the cylinder to be sealed, the whole being dimensioned so that the lobe of the seal projects from the annular groove and is urged against the piston by a relatively low elastic force.

In the above-described applications of the annular seal in accordance with the present invention, with a single-acting jack, perfect sealing is obtained despite the relatively low elastic force with which the lobe of the seal is applied against the cylinder or piston. This results from the following fact: although, during maneuvers of the jack, the lower part of annular face 2a of the seal 1 is generally left permanently applied against the corresponding wall of the annular groove G, and thus isolates its annular recess 5 from space Ea located below the flank 4a of the seal lobe, when fluid under pressure arrives, in the direction of arrow F, in the space between piston P and cylinder C, part of the fluid passes through the radial grooves 6 of seal 1 and penetrates into its annular recess 5; on its upper wall and on its right wall, including the rib 5a, the fluid under pressure exerts forces which tend to apply the cylindrical surface 3 and the second annular face 2b of seal 1 respectively, against the corresponding wall of the annular groove G. The effect of this is to squeeze the seal 1 against the walls of groove G and thus prevent the fluid under pressure working round seal 1 along its outside faces 3 and 2b into the annular space Eb. On the other hand, the fluid under pressure introduced into the annular recess 5 of the seal 1 exerts pressure on the inner wall of the recess, the radial resultant of which adds to the relatively low elastic force to apply the lobe of seal 1 against cylinder C in the case illustrated in FIG. 3. Since this radial resultant is proportional to the pressure of the fluid, the total force with which the lobe of the seal is applied against the surface of the cylinder increases at the same time as the fluid pressure, which ensures permanent adaptation of the seal at the level of the lobe of the annular seal to the fluid pressure with which the jack is supplied.

Figure 4:
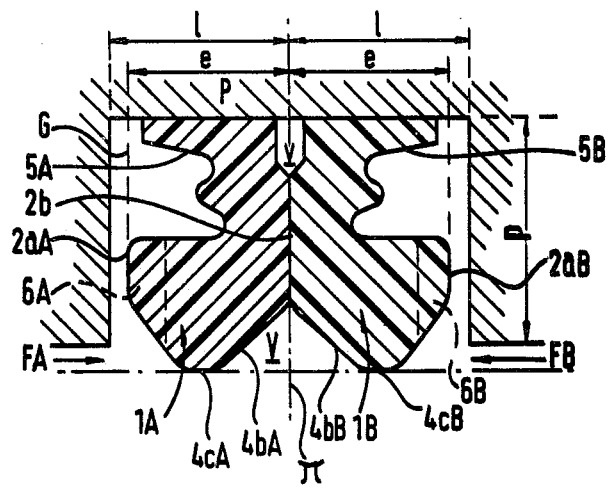
FIG. 4 illustrates in radial cross-section an application of two seals of the type shown in FIGS. 1 and 2 to seal a cylinder and piston for a double-acting jack.

FIG. 4 illustrates the application of annular seals in accordance with the present invention to seal a cylinder and piston of a double-acting jack. In the example shown, two identical annular seals in accordance with the invention 1A and 1B are located in a single annular groove G of the piston P so as to bear against each other by their second annular faces 2b. In the example shown, the contour of the annular seal 1A in radial cross-section, is identical with that of the annular seal 1 in FIG. 3. Furthermore, the sum of the axial thicknesses 2e of the two annular seals 1A and 1B, is a little less than the axial width 2L of the annular groove G of piston P, as seen in FIG. 4. Finally, the annular seals 1A and 1B and the annular groove G of piston P are in general dimensioned as a function of the diameters of the cylinder and piston and the elasticity of the seal material, so that the opposite races 2aA and 2aB of the two seals 1A and 1B are elastically urged, at least by their lower parts, against the corresponding walls of the groove G. This results in the seal 1A being deformed radially as shown by the dotted line for seal 1 in FIG. 3, when the piston P equipped with two seals 1A and 1B is introduced into the cylinder of the double-acting jack, while seal 1B undergoes a radial deformation symmetrically opposite to that of seal 1A relative to the plane $\pi$. The summit surface 4cA or 4cB of each of the annular seals 1A and 1B then bears against the cylinder with a relatively low radial elastic force to which is added later a radial force proportional to the pressure of the fluid, which, depending on whether the piston P is to be displaced to the right or left, is fed into the gap between piston P and the cylinder of the jack (not shown), in the direction of arrow FA and FB. This pressure then penetrates into the annular recess 5A or 5B of the seal 1A or 1B, via radial channels 6A or 6B. For the cylinder and piston of a pneumatic jack, having the diameters given previously a single annular groove G having a depth p=8 mm and a width 2l=12 mm is sufficient to locate two annular seals 1A and 1B each having the dimensions given before. The use of two multi-lip seals of the type previously known, would necessitate, in contrast, two distinct annular grooves each having a depth of 8 mm, axial width of 9 mm, and an axial separation of 4 mm, so that the sealing system would occupy an axial space of 22 mm; i.e. 83% more axially than the single groove G in accordance with the present invention. The reduction of the axial length of the sealing system in accordance with the present invention is very advantageous for certain applications.

In the application of two annular seals in accordance with the present invention to seal a double-acting jack, as illustrated in FIG. 4, there exists between the flanks 4bA and 4bB of the two seals and the cylinder (not shown in FIG. 4) an annular space V where a reserve of grease may be stored to provide prolonged lubrication.

The present invention is not limited to the embodiment described above. Thus, instead of being constituted by a radial groove the communicating channels of the annular seal can be conduits of closed section. These closed-section conduits can be obtained by moulding or by piercing. One of the connecting surfaces of the seal can form several lobes with reduced summit area, preferably rounded, and an annular recess can be arranged in each of these two annular faces to give great radial elasticity; this would be the case of a single annular seal the contour of which, in radial cross-section, would correspond to the overall contour of the two independent seals which are represented, abutting side-by-side by their second annular faces 2b, in FIG. 4. In such an embodiment, the above referred upper recess V could be eliminated.

The application of annular seals in accordance with the present invention and illustrated in FIGS. 3 and 4 may also be modified. Thus the axial width of the single annular groove G of the piston or cylinder can be chosen exactly equal to the axial thickness of a single annular seal or the sum of the axial thicknesses of the two annular seals. In this latter case, it is the presence of the annular recess 5 of each seal in accordance with the present invention which alone allows its small radial deformation during its introduction into the cylinder. The radial grooves 6 or 6A and 6B, or equivalent communicating channels, can be omitted; in this case sealing is assured solely by the elastic force which applies the summit surface of the lobe of each annular seal against the cylinder or piston.

The annular seals in accordance with the present invention can also be used to seal the cylinders and pistons of compressors, refrigerators, etc. They can also serve to seal various rotating elements, enclosing fluids under pressure or depression relative to the ambient atmosphere; in this case, the annular seal in accordance with the present invention is preferably fitted in an annular groove of reduced axial width, in the fixed piece. There are, for example, fluid distributing boxes with seals, in rotating shafts including annular jacks, such as those necessary in tire making machines. Although the embodiments previously described, of the annular seal in accordance with the present invention, are more particularly intended to retain a compressible fluid, notably air under pressure or depression i.e. vacuum, other embodiments of the said seal can be adapted to retain a more or less incompressible fluid, in particular under much higher pressures, such as oleic or hydraulic liquids. The seals in accordance with the present invention for oleic or hydraulic liquids are preferably made so as to offer less radial elasticity, notably by reducing the relative dimensions of their annular recess (5 in FIGS. 1 to 3) and/or the reinforcement of their lobe, the summit area 4c of which is then preferably flattened, and the flank slopes (4a and 4b) being reduced (so as to reduce the sections of spaces Ea and Eb of FIG. 3). Further, such seals for high pressures, are preferably located in grooves of reduced width, in particular of axial width not greater than their axial thickness (e in FIG. 1).

Having now described my invention;
What I claim is:

1. A seal assembly having a high pressure and a low pressure side for sealing on one side thereof a working fluid under high pressure said seal assembly comprising two rigid members, one of said members having wall portions defining an annular groove, an annular seal located in said groove, said seal having first and second end faces in engagement with the wall portions of said groove adjacent thereto; a sidewall extending between said end faces and defining a sealing surface protruding from said groove to bear against the other of said members; one of said end faces being shaped to define an annular recess; a plurality of channels in said sidewall to place said recess in communication with said sealing surface through said channels.

2. A seal assembly according to claim 1 wherein said sealing surface defines at least in part the surface of a lobe having a central summit region with flanks on either side thereof; said summit region bearing against said other of said members.

3. A seal assembly according to claim 2 wherein said channels connect said recess with one of said flanks so that said recess is in communication with the high pressure side of said seal.

4. A seal assembly according to claim 3 wherein said channels are constituted by radially extending grooves.

5. A seal assembly according to claim 2 wherein said summit region is rounded in cross-section.

6. A seal assembly according to claim 1 wherein said sealing surface is directed radially outwards.

7. A seal assembly according to claim 1 wherein said sealing surface is directed radially inwards.

8. A seal assembly according to claim 1 wherein the axial thickness of said seal in an unassembled condition is less than the axial width of said groove and the dimensions of said groove and seal and said other member are selected so that said end faces are urged into engagement with said wall portions of the groove in the assembled condition.

9. A seal assembly according to claim 1 wherein two of said seals are provided in said groove.

10. A seal assembly according to claim 9 wherein the recessed end faces of said seals face away from each other.

11. A seal assembly according to claim 10 wherein the confronting end faces of said seals are cut out to define an annular grease reservoir.

12. A seal assembly having a high pressure and a low pressure side for sealing on one side thereof a working fluid under high pressure, said seal assembly comprising two rigid members, movable in relation to each other, one of said member having wall portions defining an annular groove, an annular seal of resilient material located in said groove, said seal having:

a first annular end face facing toward the high pressure side and a second annular end face facing toward the low pressure side, said faces being in engagement with wall portions of said groove adjacent thereto;

a sidewall extending between said end faces and defining a sealing surface protruding from said groove to bear against the other of said members;

means to bias said sealing surface toward said other member in proportion to the intensity of said high pressure, said means comprising an annular recess in said first annular end face and a plurality of channels in said sidewall communicating the recess with the high pressure so as to pressurize the recess and outwardly bias the sealing surface of the resilient sidewall in response to an increase in pressure.

13. The seal assembly of claim 12 including a rib at the bottom of the annular recess.

14. The seal assembly of claim 12 in which the depth of the annular recess is approximately half the axial thickness of the seal.

* * * * *